(12) United States Patent
Yoshino et al.

(10) Patent No.: US 7,484,953 B2
(45) Date of Patent: Feb. 3, 2009

(54) SYNTHETIC RESIN INJECTION MOLDING ASSEMBLY

(75) Inventors: Ryuji Yoshino, Tokyo (JP); Osamu Takenouchi, Tokyo (JP)

(73) Assignee: Yamashita Electric Co. Ltd., Tokyo (JP)

( * ) Notice: Subject to any disclaimer, the term of this patent is extended or adjusted under 35 U.S.C. 154(b) by 197 days.

(21) Appl. No.: 11/509,889

(22) Filed: Aug. 26, 2006

(65) Prior Publication Data
US 2007/0092595 A1 Apr. 26, 2007

(30) Foreign Application Priority Data
Oct. 25, 2005 (JP) ............................. 2005-309547

(51) Int. Cl.
B29C 45/73 (2006.01)
(52) U.S. Cl. .................. 425/547; 425/548; 425/552
(58) Field of Classification Search ................ 425/547, 425/548, 552
See application file for complete search history.

(56) References Cited

U.S. PATENT DOCUMENTS 5,423,670 A * 6/1995 Hamel ........................ 425/548
6,019,931 A * 2/2000 Kashiwagi ................... 425/548

FOREIGN PATENT DOCUMENTS

| JP | 2003-181838 | 7/2003 |
| JP | 2004-249640 | 9/2004 |

* cited by examiner

Primary Examiner—Tim Heitbrink
(74) Attorney, Agent, or Firm—Martin Smolowitz (57) ABSTRACT

A synthetic resin molding mold assembly, is provided for rapidly heating a cavity surface without suffering from any temperature variation in the cavity surface when a temperature of the cavity surface increases; this condition is not affected by a contour of the cavity surface; and, may prevent any weld line from occurring without prolonging a molding cycle time. A mold insert is employed that is divided into an insert front piece with the cavity surface and an insert rear piece without the cavity surface. A fluid passage is formed to pass through the front piece in the vicinity of the cavity surface and extends from a rear surface of the rear piece to pass there-through toward the cavity surface, receives an electric heater therein, and is then closed with the rear piece to dispose the heater in a deepest portion of the fluid passage.

2 Claims, 11 Drawing Sheets

POINT A: MOLD CLAMP RELEASING POINT AND HEATING STARTING-UP POINT
POINT B: MOLD CLAMPING COMPLETION POINT AND HEATING STOPPING POINT
PERIOD A: MOLDED PRODUCT COOLING PERIOD

SYNTHETIC RESIN INJECTION MOLDING ASSEMBLY

BACKGROUND OF THE INVENTION

1. Field of the Invention

The present invention relates to a mold assembly used in injection molding, compression molding and like molding processes for molding thermoplastic resins, thermosetting resins and like synthetic resins into a molded product, more particularly to a synthetic resin molding mold assembly, in which a cavity surface of a mold piece of the mold assembly is alternately heated and cooled in the molding processes.

2. Description of the Related Art

As a factor in the causation of a defect in the quality in of appearance of such a molded product, there is a so-called "weld line" problem, which comes up in the art.

As for the weld line, it tends to appear in the confluence area of streams of a plurality of streams of a molten resin that filled the mold cavity when such streams having upstream portions that differ in flow direction and have their leading end (i.e., downstream end) portions combined with each other inside the mold cavity. More specifically, when these leading stream end portions in streams of the molten resin are brought into contact with a cavity surface of the mold cavity in the assembly, a surface of the molten resin is cooled down and a solidified resin layer is formed in each of the leading end portions of these streams of molten resin inside the mold cavity. As a result of such solidified resin layer, it becomes impossible for this resin layer to closely replicate a surface of the mold cavity in the assembly even when the molten resin is completely filled in the mold cavity and retained therein under a predetermined retention pressure. A failure in closely replicating the surface of the mold cavity in the assembly leads to the formation of a tiny groove. The groove assumes a V-shaped form (in cross section) on the surface of the molded product and is called the "weld line" in the art.

Figure 11:
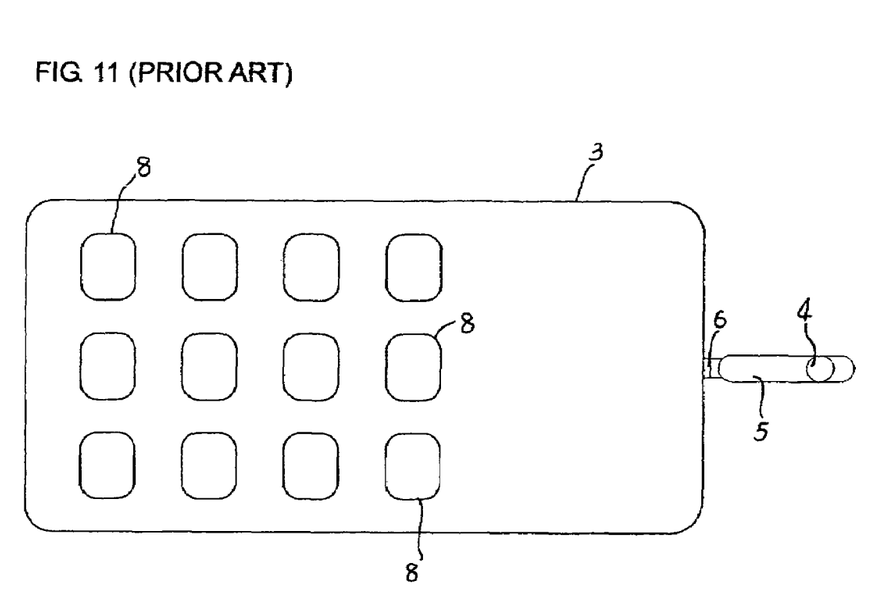
FIG. 11 is a schematic plan view of the conventional type of synthetic resin molding mold assembly.
Figure 12:
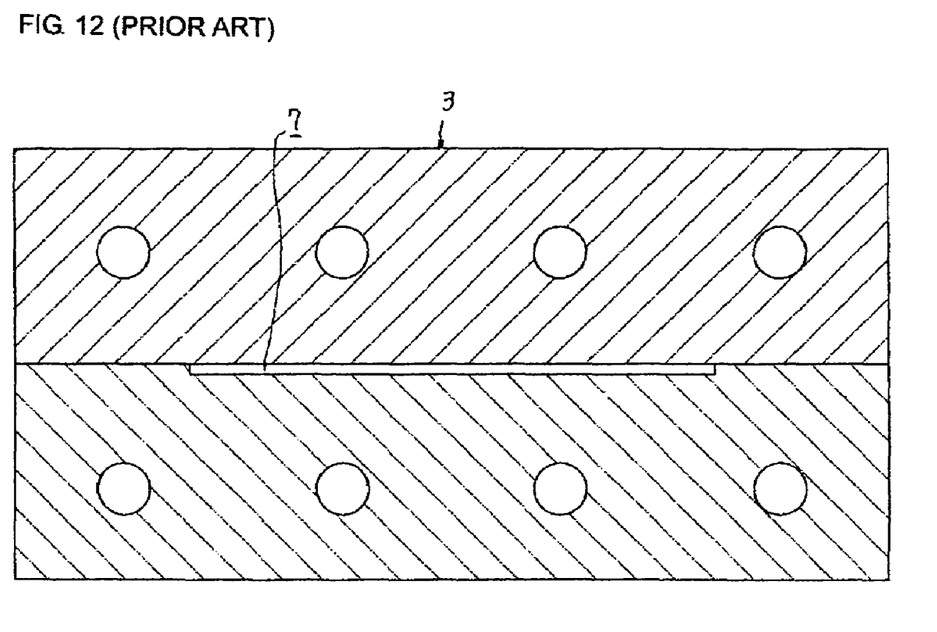
FIG. 12 is a schematic longitudinal sectional view of the conventional mold assembly shown in FIG. 11.
Figure 13:
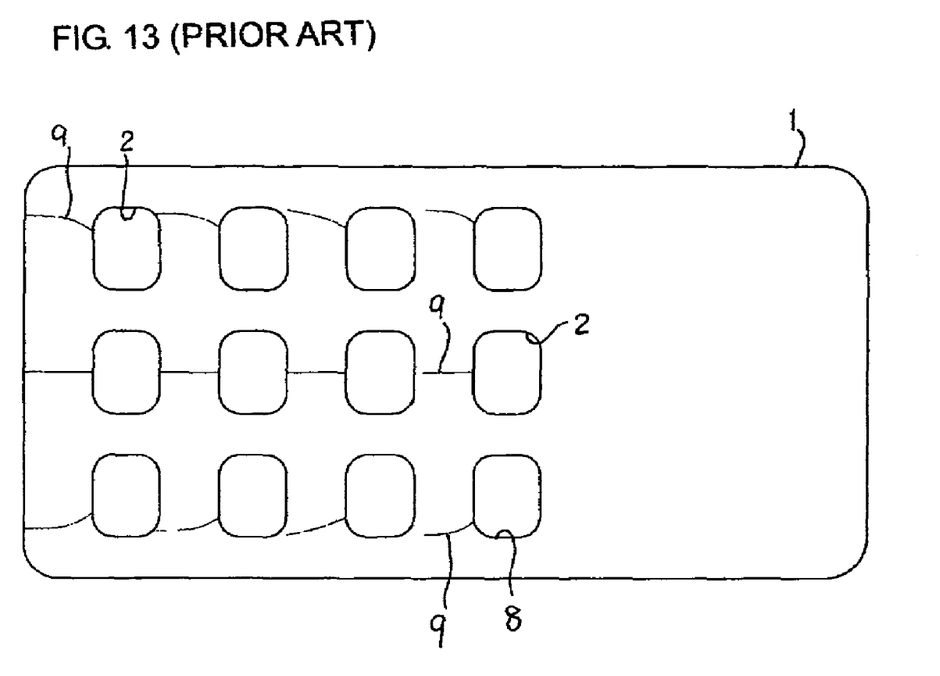
FIG. 13 is a plan view of the molded product produced by using the conventional mold assembly shown in FIG. 11.

For example, when a molded product 1 provided with a plurality of opening portions 2 (see FIG. 13) is molded by using a conventional type of mold assembly 3 (see FIGS. 11 and 12), the molten resin is supplied to cavity space 7 of the mold piece of the assembly 3 through its sprue 4, runner 5 and its gate 6, and filled in the cavity space 7. The molten resin thus supplied is divided into a plurality of streams in the mold cavity of the assembly 3 by means of a plurality of core portions 8 (see FIG. 11) of the mold assembly 3. Each of the core portions 8 is adapted to form each of the opening portions 2 of the molded product 1; and, the streams of molten resin thus supplied and divided are combined with each other in a downstream side of each of these core portions 8. As a result, a plurality of weld lines 9 are produced in the downstream sides of the ss core portions 8 in the molded product, as shown in FIG. 13.

The molded product is made of polycarbonate (transparent resins) and has: a length of 100 mm; a width of 50 mm; and, a thickness of 1.2 mm, that is, a size of 100 mm length×50 mm width×1.2 mm thickness. The gate of the mold is constructed of a single side gate only.

In order to prevent the weld line from occurring in the molded product, it is necessary to heat the mold assembly to a relatively higher temperature when the molten resin is fills the mold cavity of the assembly. After molten resin fills in the mold cavity of the assembly, a predetermined retention pressure is applied to the mold assembly. However, heating the mold assembly to such a relatively higher temperature will be followed by a relatively longer period of cooling time of the mold assembly thus heated. This results in a longer molding cycle time since it is difficult to sufficiently cool down the molded product in a short period of time. This results in a molded product still not sufficiently cooled down, and difficult to smoothly separate it from the mold cavity of the assembly. In view of the above-mentioned difficulty, various systems described before have theretofore been proposed. These relate to a heating process of the cavity surface of the mold assembly which is carried out only when the molten resin is filled in the mold assembly.

A) Hot Water/Cold Water Switching System:

In this system "A", hot water and cold water are alternately supplied to a mold temperature controlling water pipe to control a temperature of the mold assembly.

This system is advantageous because it may use an ordinary type of mold assembly and does not require any large investment for installations appurtenant to the mold assembly.

On the other hand, this system is disadvantageous since the mold temperature controlling water pipe is positioned apart from the mold surface, and since a response in controlling or increasing/decreasing a temperature of the mold assembly is not sharp; (an upper limit in temperature of the mold surface is set at a temperature of 160° C.), this system is not adequate for a resin molding process having a high glass transition temperature.

B) Cold and Heat Switching System (Steam Heating System):

In this system "B", steam and cold water are alternately supplied to a fluid passage for controlling a temperature of the mold assembly.

This system "B" is advantageous in that the rate of an increase in temperature of a mold cavity surface employed is larger than that of an increase in temperature of a mold cavity surface employing the hot water/cold water switching system (A). Further, the system (B) is advantageous in that the system (B) construction, through which a heating and a cooling medium for respectively heating and cooling the mold assembly flows, is closely arranged with a resultant reduction in temperature difference of the mold cavity surface.

On the other hand, this system (B) is disadvantageous because the system (B) restricts an upper limit in temperature of the mold cavity surface up to a temperature of 155° C. and therefore, synthetic resins which are to be used in the mold assembly employing this system (B) are strictly restricted. A very expensive production line provided with a boiler, a medium switching device and like equipment is required in the system (B). Also, any mold assembly used in the system (B) tends to rust in use even when an appropriate sealing agent is used to seal the mold assembly. Since a mold insert of a split type is used and supported by a rib in the mold assembly employing the system (B), it is necessary to increase the mold assembly thickness so as to keep its mechanical or physical strength. As a result, it is not possible for the mold assembly employing the system (B) to have its fluid passage in the vicinity of the mold cavity surface.

C) Mold Surface Insulated System:

In the mold assembly employing this system (C), a heat insulating thin film layer made of ceramic material is provided in the mold cavity surface. This arrangement impairs the heat conduction between the molten synthetic resin and mold parts or mold pieces of the assembly, so that the cooling and solidification process of a molten resin to be formed into a molded product is delayed.

This system (C) is advantageous in that does not require any introduction of new installations for production; since the heat insulating thin film layer is formed by using a surface coating technique, there is no need of directly machining any mold parts in the mold assembly employing the system (C).

On the other hand, this system (C) is disadvantageous since the rate of an increase in temperature of the mold surface is small in the mold assembly employing this system (C). A weld line when it occurs tends to remain and appear in the molded product. Furthermore, system (C) does not allow application of any additional processing work to an outer surface of a mold cavity of the mold assembly and, it is impossible to finely control the mold cavity surface in temperature.

D) High Frequency Induction Heating System:

In this system (D), a magnetic field is produced by using an electric current supplied to an induction coil disposed adjacent to the mold cavity surface, so that an electric current is induced in the mold cavity surface. The Joule heat produced increases the temperature of the mold cavity surface.

This system (D) is advantageous because it is possible for the mold assembly to have its mold cavity surface temperature to be sufficiently increased, i.e., it is possible to heat the mold cavity surface up to a temperature of 250° C. or greater; also the rate of increase in temperature of the mold cavity surface is large; and with in this system (D), since heating of the mold cavity surface is obtained using an extraneous means, processing or machining the mold piece is not necessary.

On the other hand, this system (D) is disadvantageous since it is not possible for a plurality of induction coils to heat a portion of the mold cavity surface disposed between adjacent induction coils, system (D) tends to suffer from large variations in temperature of the mold cavity surface. It is still not possible in the art to produce certain unusually shaped induction coils necessary to follow a corresponding shape of a mold cavity surface and, since heating of the synthetic resin in the molding process is not realized in the mold assembly employing this system (D), the resultant molding process takes a much longer period of processing time (i.e., much longer molding cycle time).

E) Radiant Heating System:

In system (E), the mold cavity surface is radiated with a halogen lamp when the mold assembly is opened in retrieving the molded product.

System (E) is advantageous since radiation of the mold cavity in the mold assembly is realized by an extraneous means, and it is not required to apply a processing or machining work to the mold assembly itself.

On the other hand, the system (E) is disadvantageous because an increase in temperature of the mold cavity surface takes a much longer period of radiation time. Also, when a mold cavity surface of the assembly varies in height, system (E) cannot meet such a mold cavity surface that varies in height.

F) Electrically Energizing System:

In this system (F), a mold assembly has its mold cavity surface coated with an insulating layer and the insulating layer is further coated with an electrically conductive layer. By directly supplying an electric current to an electrode of the mold assembly, heat is produced to increase temperature of the mold cavity surface temperature.

System (F) is advantageous because the rate of increase in temperature of the mold cavity surface is large; and it is possible to keep the mold cavity surface at a relatively higher temperature (i.e., a temperature of 250° C.). Also, there is substantially no need of processing or machining the mold assembly itself.

On the other hand, this system (F) is disadvantageous since an electric current tends to pass through the shortest possible path between electrodes, it is not possible for this system (F) to evenly heat the mold cavity surface.

G) Cartridge Heater System:

In this system (G), a cartridge heater is provided in the mold assembly to heat the assembly.

System (G) is advantageous as it is possible to keep the mold assembly at a relatively high temperature range and, the mold assembly employing this system (G) is installed in an easy manner.

On the other hand, system (G) is disadvantageous because a relatively longer period of time is required in changing a temperature of the mold assembly as it is generally impossible to control a temperature of the mold assembly during its molding cycle. Furthermore, when the mold cavity surface varies in height, it becomes impossible to evenly heat the mold cavity surface since the cartridge heater is not flexible in construction. Furthermore, to reduce a difference in heating effects in the mold cavity surface, it is necessary to increase the number of heaters.

As for the above-mentioned various systems, anyone of these systems has both its advantages and disadvantages. For example, in some systems, a flow of cooling medium passes through the mold assembly and in another system, a cartridge heater is inserted into the mold assembly. In all cases, it is necessary to form the mold assembly with a fluid passage adapted for such cooling medium; and to have an aperture adapted for receiving the cartridge heater therein. Limitations exist when using a drill to form an insertion aperture in an outer wall of the mold assembly, because it is useful only when a straight line fluid passage can be formed; and the mold assembly allows a straight line heater to be installed in the assembly. Due to the presence of such limitations, it is not possible for anyone of the above-mentioned systems to keep a constant distance between the mold cavity surface and heating means when the mold cavity surface has a three-dimensional concave-convex contour, and such a three dimensional concave-convex contour prevents the mold cavity surface from being evenly heated.

In order to avoid a problem derived from the above limitations when processing or forming the insertion aperture, it is possible to divide a mold insert of the assembly into a plurality of split-insert pieces, wherein the plurality of split-insert pieces may be assembled into a three-dimensional circuit. In this case, when a fluid is used as the medium, and in order to avoid any possible leakage of the medium or fluid itself, it is necessary to seal all the fluid passages in the mold assembly. It follows that any mold surface thus sealed cannot be used as a reception surface for supporting the mold insert such that the mold insert abuts on the reception surface. Due to this condition, the mold insert is not sufficiently supported in the mold assembly, which decreases the physical strength of the mold assembly. In the case where the split-insert pieces of the mold insert are used, another problem arises; namely, a distortion of the mold assembly appears in the mold piece when a mold cavity surface or inner surface is present up to a depth of 4 mm or is more than 4 mm measured from an outer surface of the mold piece.

On the other hand, in the case where the fluid is used to heat the mold assembly, a difference in temperature appears between an inlet opening and an outlet opening of the circuit of the mold assembly. Furthermore, another problem arises in the case where heaters are used to heat the mold assembly, as it is not possible to arrange these heaters in close relationship with each other, which results in a variation in temperature of the mold cavity surface.

When each of the fluid passages for receiving the medium or a space adapted for the heater insertion aperture has a width of 4 mm or more and is formed in a position having a depth of 4 mm or less measured from the mold cavity surface, an area of the mold cavity surface corresponding in position to the space is distorted under a molding pressure applied to the resin filled in the mold assembly. Due to such distortion, a surface of the molded product is impaired in luster in its appearance, which leads to a defect in appearance quality.

In order to avoid these problems, it is necessary to provide the fluid passage of the medium or to provide the heater insertion aperture having a depth of 4 mm or more measured from the mold cavity surface. On the other hand, the rate of an increase in temperature of the mold cavity surface depends on both the above-mentioned depth and a heat transfer rate of material of the mold piece provided with the cavity surface, and is therefore small.

When a weld line or defect of the molded product in appearance is removed from the molded product, it is possible to eliminate the decorative coating process of the molded product carrying the weld line. This leads to a considerable cost reduction in producing the molded product, and is therefore considered as a desirable object in the art.

As a means for accomplishing the above object, it is proposed in the art to increase a temperature of the mold cavity surface to a higher point than an ordinary, whereby the weld line has its groove reduced in depth. Furthermore, it is also well known in the art that when a temperature of the mold cavity surface is increased up to a predetermined point inherent in the resin or material of the molded product, any weld line disappears. On the other hand, when the temperature of the mold cavity surface is always kept at a higher point, a resultant molded product which is still not sufficiently solidified is ejected from the mold assembly. Such an ejected mold product is often deformed upon its ejection from the mold assembly. Consequently, to avoid this condition, it is necessary to keep the mold cavity surface at a higher temperature during the resin filling process for applying a mold retention pressure to the mold assembly, and lowering the temperature in the mold cavity surface to a point at which the molded product completes its solidification and is ejected from the mold assembly.

Due to this, it is necessary to alternately heat and cool the mold cavity surface in one cycle of the injection molding process of the molded product thus produced. Therefore, various types of the above-mentioned systems have been proposed in the art. However, any one of these systems having been proposed in the art have advantages and disadvantages. Under such circumstances, there is still no established and reliable technique in the art with respect to the instant subject matter.

SUMMARY OF THE INVENTION

Under such circumstances, the present invention was made to solve the problems inherent in the prior art.

Consequently, it is an object of the present invention to provide a synthetic resin molding mold assembly, wherein: the mold assembly is free from any influence of the contour of a mold cavity surface in the mold assembly; the mold assembly has an electric heater disposed in the vicinity of any portion of the mold cavity to permit a mold piece of the assembly to be rapidly heated to a predetermined temperature without causing any variations in the rate of an increase in temperature of the mold piece; and a weld line is prevented from occurring all without prolonging a molding cycle time of the mold assembly.

The object of the present invention is accomplished according to a first aspect of the present invention by providing:

In a synthetic resin molding mold assembly for producing in a molded product, a surface of which is replicated from a mold cavity surface when a molding material is filled in a cavity space defined by a mold insert, wherein the mold assembly comprises the mold insert and a mold base for supporting the mold insert, the improvement is defined by the mold insert being divided into an insert front piece with a cavity surface; and, an insert rear piece without the cavity surface; a fluid passage is formed in a manner such that it passes through the insert front piece in the vicinity of the cavity surface, and extends from a rear surface of the insert rear piece to pass there-through toward the cavity surface; the fluid passage is adapted to receive an electric heater and is then closed with the insert rear piece and the electric heater in a deepest portion of the fluid passage.

Figure 6:
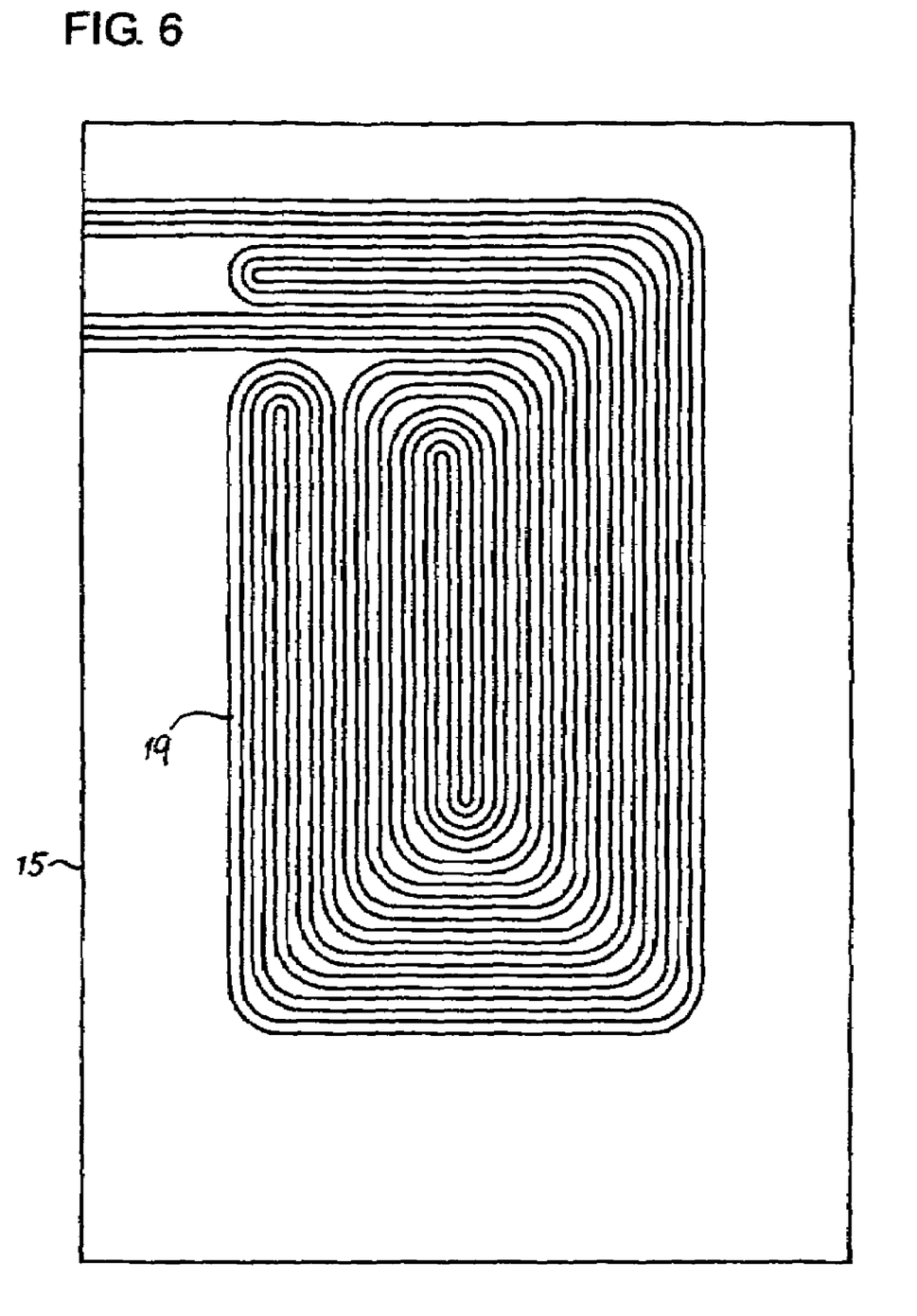
FIG. 6 is a bottom view of the insert front piece shown in FIG. 5.
Figure 7:
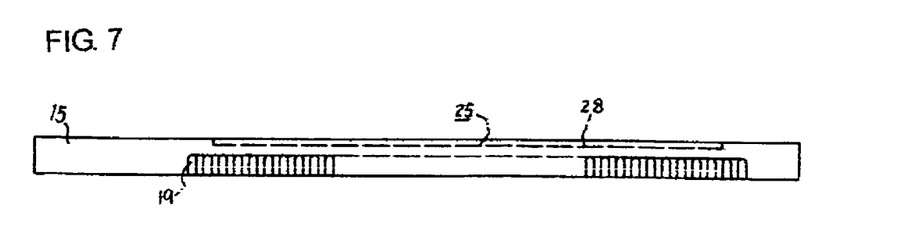
FIG. 7 is a right side view of the insert front piece shown in FIG. 5.

Preferably, the groove for receiving the electric heater may be of a straight line-like shape, or, alternatively a curved shape. The number of the electric heaters may be one or more. When a plurality of the electric heaters are employed, it is possible to arrange the grooves, which correspond to these electric heaters, side by side. As shown in FIGS. 6 and 7, the groove corresponding to the electric heater also may be of a spiral shape. When a plurality of the electric heaters are employed, it is possible to arrange the grooves concentrically with each other. Still further, it is possible to arrange the groove to assume a three-dimensional shape having a higher and a lower portion together with a shoulder portion, so as to extend in length with the corresponding electric heater having been formed into a corresponding three-dimensional shape.

The electric heater may be bent in use constructed as a single piece. Alternatively, it is also possible to employ a plurality of the electric heaters which may be arranged side by side. The temperature for these heaters can be individually controlled.

According to a second aspect of the present invention, the following mold assembly having been described in the first aspect of the present invention in which the mold assembly includes an electric heater constructed of a thin pipe type electric heater having excellent flexibility in use.

The effects of the present invention are as follows:

In the synthetic resin molding mold assembly according to the first aspect of the present invention there is a mold insert divided into an insert front piece with a cavity surface. The assembly has the fluid passage formed by machining the insert front piece to form the fluid passage which extends from the side of the rear surface of the insert front piece to the cavity surface. As a result, in contrast with a conventional mold assembly, an aperture for receiving a cartridge heater is formed from a side surface of a mold piece of the conventional mold assembly, so the aperture assumes a straight line-like shape extending from such a side surface of the mold piece of the conventional mold assembly. The mold assembly of the present invention permits its groove to assume an optimum shape following to the contour of the cavity surface. In other words, when the cavity surface is provided with a shoulder portion, an uneven portion or curved portion, the groove is machined so as to follow such shoulder portion, uneven portion or curved portion. The groove is thus defined to assume its optimum shape capable of following any concrete shape or contour of the cavity surface. As a result, it is possible for the mold assembly of the present invention to maintain a distance between the groove and the cavity surface at a predetermined constant value. This also makes it possible to dispose the electric heater in the deepest portion of the groove and keep the heater at the deepest portion, all of which makes it possible to keep constant a distance of heat conduction at any portion of the cavity surface between the heater and the cavity surface. It follows that it is possible for the electric heater to evenly and rapidly heat the mold piece of the assembly to a predetermined temperature in a higher temperature range without causing any temperature variation in the cavity surface increasing a temperature of the mold piece.

As described above, both the insert front piece and the insert rear piece of the mold assembly are evenly and rapidly heated to a predetermined temperature in the higher temperature range without causing any temperature variation in the cavity surface, and kept at the predetermined temperature in the higher temperature range. As a result, in the mold assembly of the present invention, there is no concern that the weld line appears in the confluence area of the streams of molten resin filled in the mold when these streams have upstream portions that differ from each other in flow direction and their leading end (i.e., downstream end) portions are combined with each other inside the mold cavity. This makes it possible to have a molded product, free from the weld line and therefore improved in appearance quality.

In the mold assembly according to the first aspect of the present invention, it is possible to increase a temperature of the cavity surface up to 250° C. or more. In other words, the synthetic resin or molding material used in the mold assembly of the present invention, is capable of being rapidly heated up to its glass transition temperature or more. It is also possible for the mold assembly of the present invention to use a plurality of the electric heaters which are arranged or disposed closely to each other. This arrangement of heaters makes it possible to prevent any temperature variation from occurring in the cavity surface. With the exception of a power supply, the mold assembly of the present invention does not require any special installation at all. This makes it possible to construct the mold assembly of the present invention at a low cost. As for a thickness of the mold insert in the assembly of the present invention, it is possible for a user to arbitrarily determine a value of such a thickness, so that it is possible for the mold assembly of the present invention to keep the mold insert thereof at a sufficient value of physical strength. Furthermore, in the mold assembly of the present invention, since no medium for heating and cooling the mold assembly is used, it is possible to provide the mold assembly substantially free from any rust according to the present invention.

With respect to the groove for receiving the electric heater therein, it is possible to expose the entire length of the electric heater to the outside when the insert front piece is separated from the corresponding insert rear piece. When the current one of the electric heaters is maintained or replaced with a new one, it is possible to maintain or replace the current heater in an easy manner.

The mold assembly according to the second aspect of the present invention employs a thin pipe type electric heater, which is excellent in flexibility and capable of being arranged in shape according to the contour of the cavity surface. It is possible to arrange or bend the electric heater in accordance with the contour of the cavity surface so as to be capable of being inserted into the groove even when the contour of the cavity surface is of a three-dimensional contour having a difference in height of the surface. This makes it possible for the electric heater to evenly heat the entire area of the three-dimensional cavity surface and to rapidly increase the temperature of the cavity surface to any arbitrary desired temperature.

As described above, it is possible to arbitrarily bend and install the electric heater in the groove of the cavity surface. As a result, it is possible for even a single electric heater to increase a temperature of a wide area of the cavity surface. Therefore, increasing the temperature of such a wide area of the cavity surface may be realized at low cost.

Since the electric heater can be readily bent in use or installation thereof in the mold assembly of the present invention, it is possible to dispose the electric heater in any shoulder portion, any curved portion and any side portion of the cavity surface. This makes it possible to keep the electric heater apart from the surface of the mold piece by a predetermined constant distance.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings, in which: the reference numeral 10 denotes a mold assembly; 11 a fixed mold piece; 12 a movable mold piece; 13 a mold base of the movable mold piece; 14 a mold base of the fixed mold piece; 15 an insert front piece of the movable mold piece; 16 an insert rear piece of the movable mold piece; 17 an insert front piece of the fixed mold piece; 18 an insert rear piece of the fixed mold piece; 19 a fluid passage provided in an insert front piece of the fixed mold piece; 20 a fluid passage provided in an insert front piece of the fixed mold piece; 21 an electric heater provided in the movable mold piece; 22 an electric heat provided in the fixed mold piece; 23 a rib provided in the insert rear piece of the movable mold piece; 24 a rib provided in the insert rear piece of the fixed mold piece; 25 a cavity space; 26 a fluid passage for receiving therein a cooling medium in the movable mold piece; 27 a fluid passage for receiving therein a cooling medium in the fixed mold piece; 28 a cavity surface; and 29 denotes another cavity surface.

FIGS. 1 to 7 show an embodiment according to the first aspect of the present invention. As in the case of a conventional mold assembly for molding a resin, a synthetic resin molding mold assembly 10 is constructed of basic elements including; the movable mold piece 11; and, the fixed mold piece 12 (other constituent elements of mold assembly 10 are omitted and not shown in the accompanying drawings).

Figure 9:
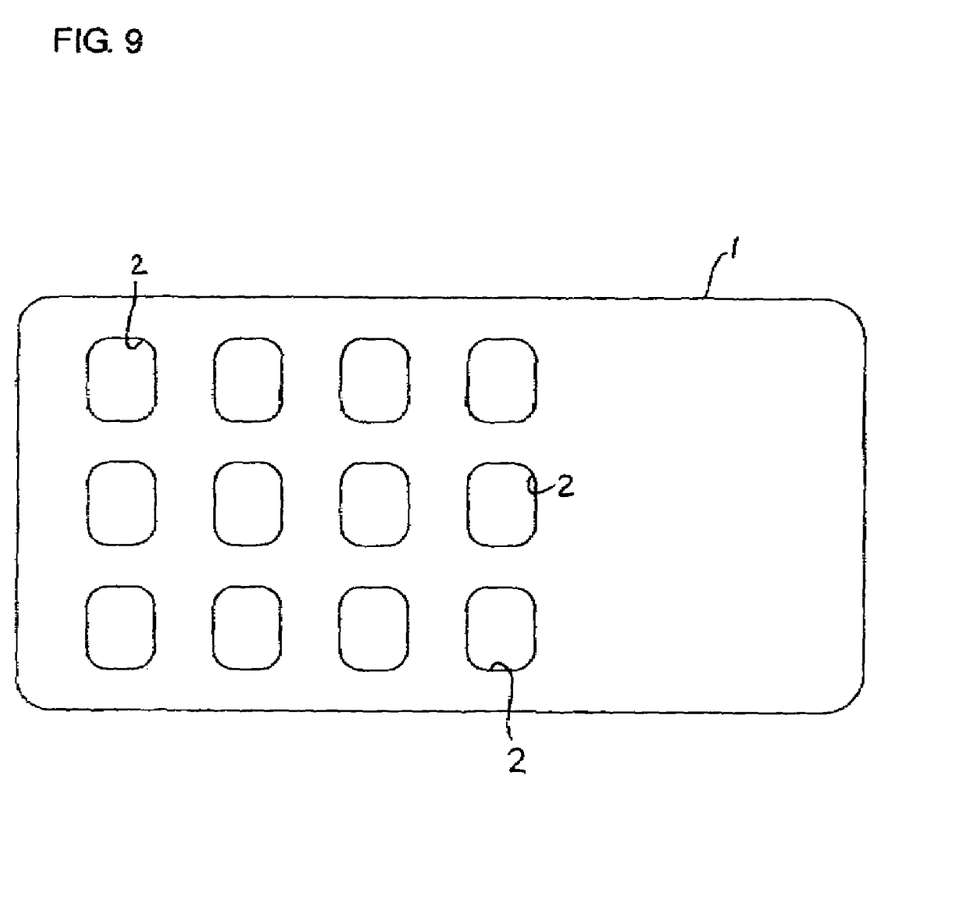
FIG. 9 is a plan view of the molded product produced by using the mold assembly of the embodiments of the present invention.

This mold assembly 10 is adapted to produce a flat plate-like molded product 1 as shown in FIG. 9 and provided with a cavity space 25 defining a flat space in the assembly.

Figure 1:
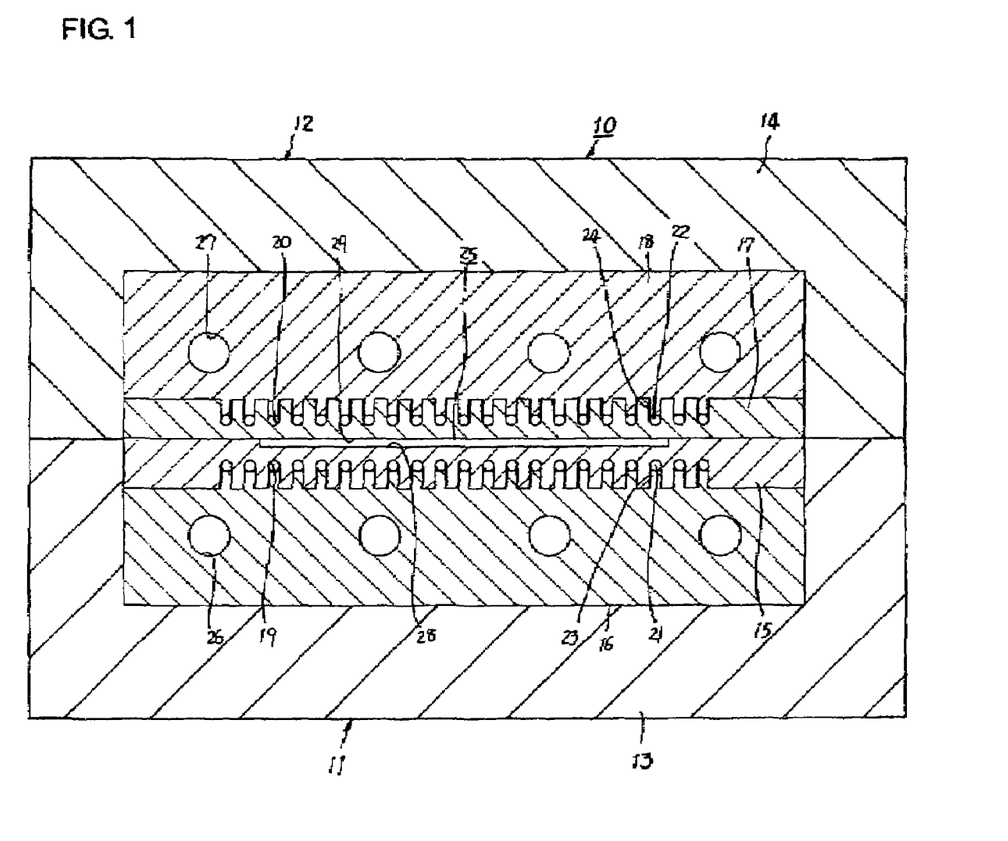
FIG. 1 is a schematic longitudinal sectional view of the synthetic resin molding mold assembly according to an embodiment of the present invention, illustrating the mold insert and mold base.
Figure 2:
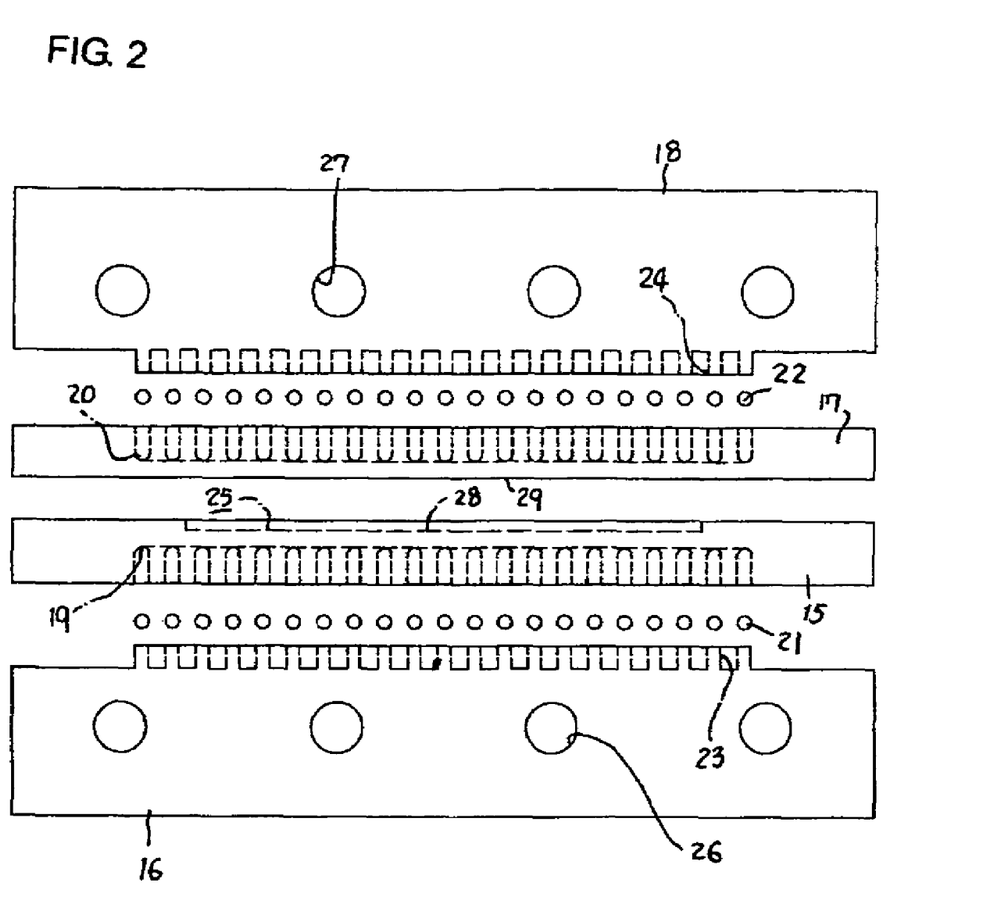
FIG. 2 is a front left view of the mold insert shown in FIG. 1, illustrating the mold insert having been separated.
Figure 3:
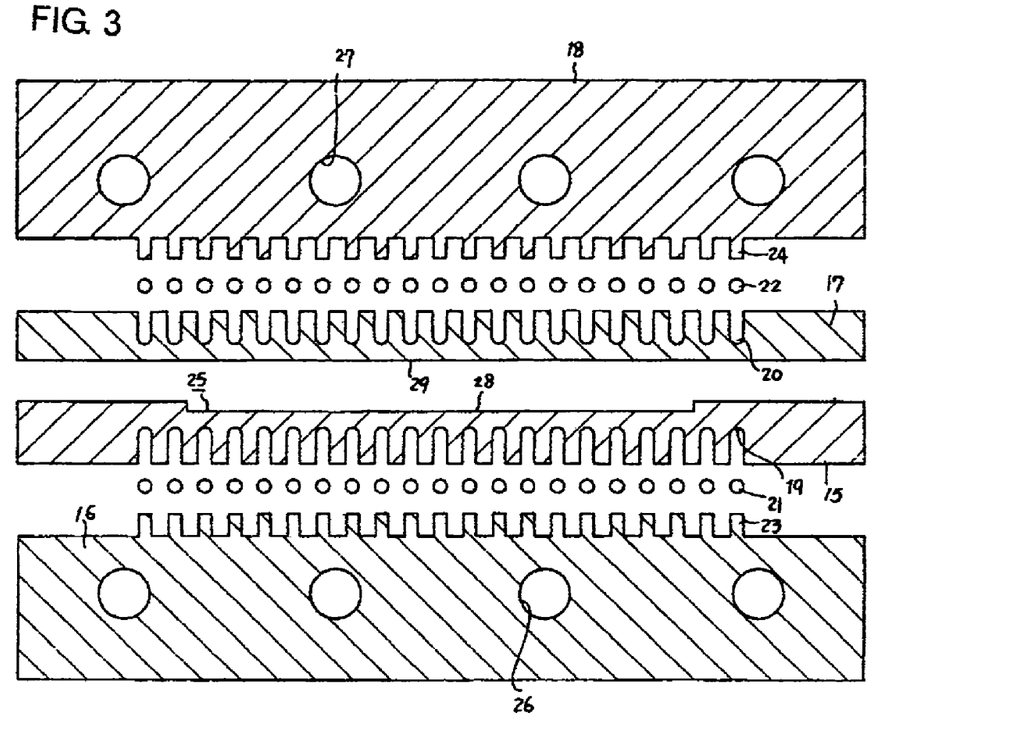
FIG. 3 is a longitudinal section view of the mold insert shown in FIG. 1, illustrating the mold insert having been separated.
Figure 4:
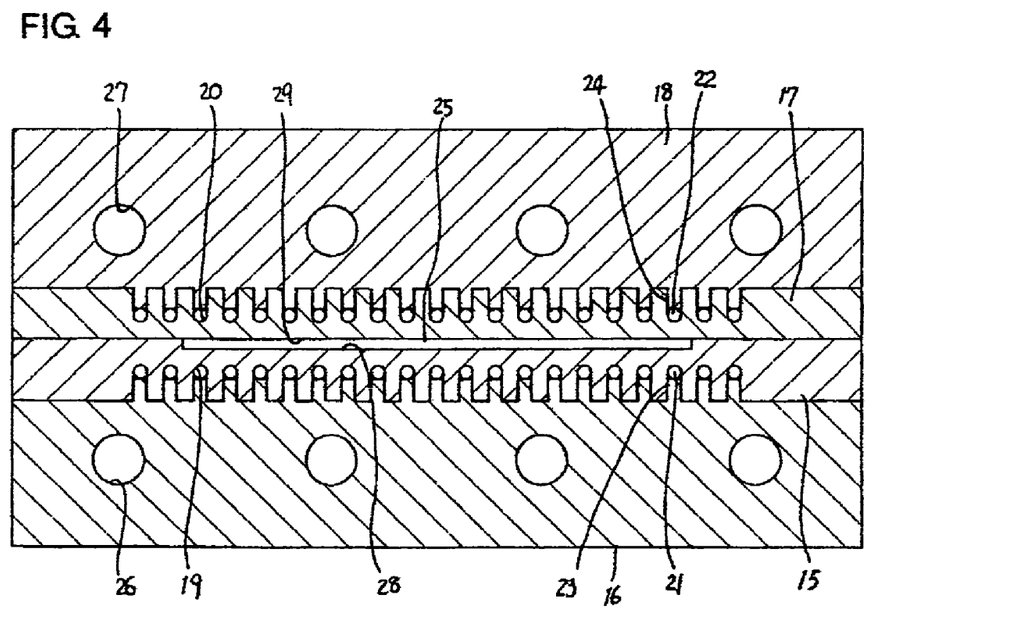
FIG. 4 is a longitudinal sectional view of the mold insert shown in FIG. 1, illustrating the mold insert having been assembled.
Figure 5:
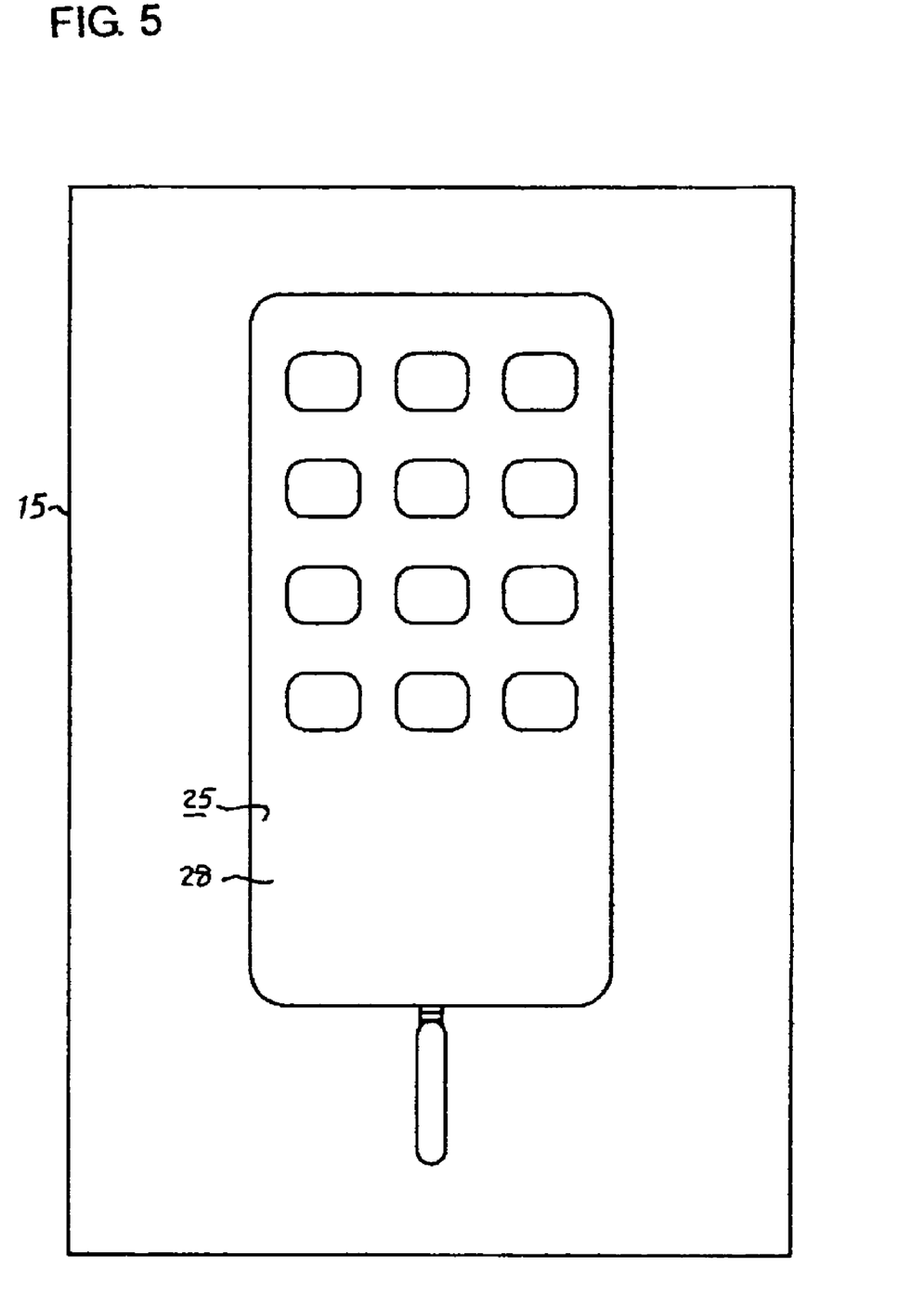
FIG. 5 is a front view of the insert front piece of the movable mold piece in the mold assembly shown in FIG. 1.

In mold assembly 10, the movable mold piece 11 is constructed of: a first mold base 13 and a mold insert which is divided into two halves, that is, an insert front piece 15 and an insert rear piece 16. A fixed mold piece 12, is constructed of a second mold base 14 and another mold insert which is divided into the insert front piece 17 and the insert rear piece 18.

The insert front piece 15 of the movable mold piece 11 is provided with a flat lower surface, formed side by side in which the lower surface is formed with a plurality of concave portions or grooves 19 each having a predetermined depth. On the other hand, the insert front piece 17 of the fixed mold piece 12 is provided with a flat lower surface forming the cavity surface 29. When the fixed mold piece 12 is coupled to the movable mold piece 11 face-to-face, a concave portion, that is, a cavity of the insert front piece 15 of the movable mold piece 11 is closed with the insert front piece 17 of the fixed mold piece 12 to define the cavity space 25 therebetween.

The insert front piece 15 of the movable mold piece 11 is provided with a plurality of the grooves 19, as described above. These grooves 19 of the insert front piece 15 extend in parallel to each other toward a flat lower surface of the other insert front piece 17, which flat lower surface is shown in the drawings as the cavity surface 29 oppositely disposed from the corresponding flat cavity surface 28 of the insert front piece 15 of the movable mold piece 11. Further, these grooves 19 are perpendicular to the cavity surface 28 of the insert front piece 15 of the movable mold piece 11, equal in depth with each other and spaced from each other at equal intervals.

On the other hand, the insert front piece 17 of the fixed mold piece 12 is provided with a plurality of the grooves 20. These grooves 20 of the insert front piece 17 extend in parallel to each other toward an upper surface of the other insert front piece 15, which upper surface is shown in the drawings as the cavity surface 28 oppositely disposed from the corresponding flat cavity surface 29 of the insert front piece 17 of the fixed mold piece 12. Further, these grooves 20 are perpendicular to the cavity surface 29 of the insert front piece 17 of the fixed mold piece 12, equal in depth with each other and spaced from each other at equal intervals.

A plurality of ribs 23 are provided in a flat upper surface of the insert rear piece 16 at the same equal intervals as those of the grooves 19. These ribs 23 extend in parallel to each other. Each of these ribs 23 has a width slightly smaller than that of the groove 19 so as to snugly fit into the groove 19, extends upward as viewed in FIG. 1, and has a length slightly shorter in value than a depth of the groove 19 by an outer diameter of the electric heater 21. As a result, when the insert front piece 15 of the movable mold piece 11 is coupled to its corresponding insert rear piece 16, the electric heater 21 is pushed into the corresponding insert rear piece 16, the electric heater 21 is pushed into the corresponding groove 19 by means of a leading portion of the rib 23 and steadily disposed on the deepest portion of the groove 19.

It is possible to draw a straight phantom line (not shown) through which the grooves 19 have their deepest portions connected with each other. Such a phantom line may extend in parallel to the cavity surface 29, that is, a lower surface of the insert front piece 17 of the fixed mold piece 12. Preferably, a distance between each of the electric heaters 22 and this cavity surface 29 is set at a value of 4 mm or less.

As is clear from the above, the electric heater 22 is brought into close contact with the bottom of the groove 20 formed in the insert front piece 17 of the fixed mold piece 12, which ensures better heat conduction from the electric heater 22 to the insert front piece 17.

Figure 8:
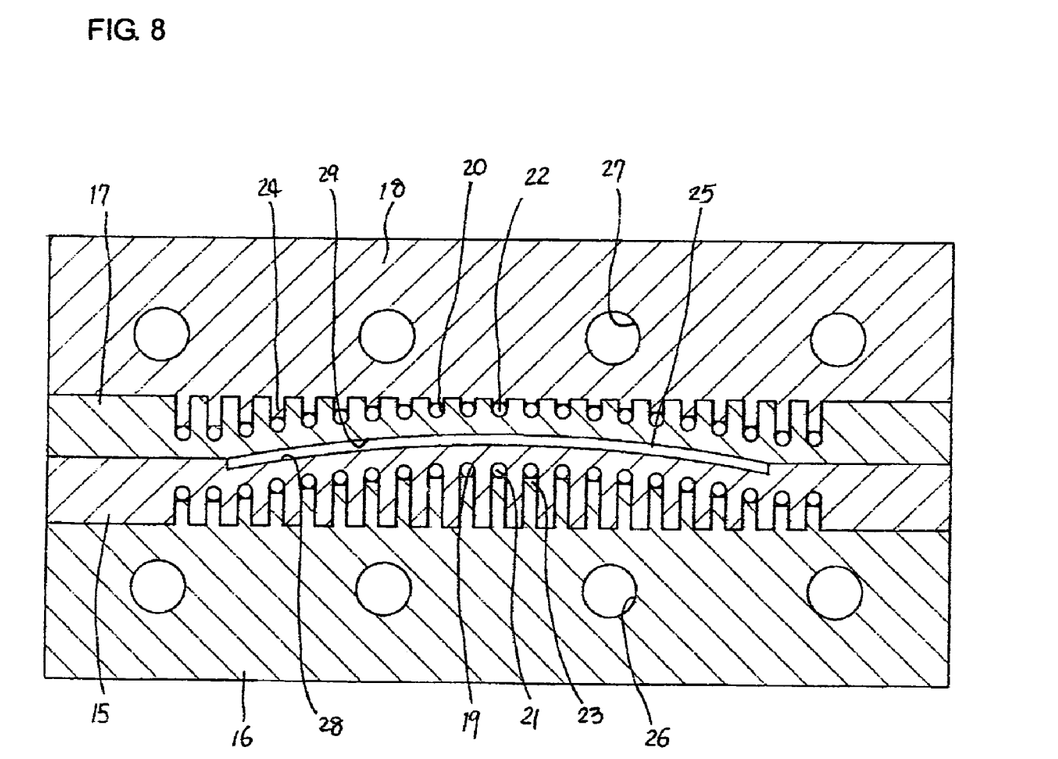
FIG. 8 is a longitudinal sectional view of the mold insert having been assembled in another embodiment of the synthetic resin molding mold assembly of the present invention.

FIG. 8 shows another embodiment of the present invention according to the first aspect of the present invention, in this embodiment, the mold assembly 10 comprises both the movable mold piece 11 and the fixed mold piece 12, as is in the conventional type of resin molding mold assembly (Other constituent elements of the mold assembly 10 are omitted in illustration and therefore not shown in the accompanying drawings, as is in the case of the previous embodiment).

The mold assembly 10 shown in FIG. 8 is adapted for molding a curved plate-like molded product, in which the cavity space 25 is curved upward so as to assume an upwardly curved or convex shape.

The movable mold piece 11 is constructed of the mold base 13 and its corresponding mold insert (15, 16). The fixed insert piece 12 is constructed of the mold base 14 and its corresponding mold insert (17, 18). As for the former mold insert (15, 16), this insert is constructed of the insert front piece 15 and the insert rear piece 16. On the other hand, the latter mold insert (17, 18) is constructed of the insert front piece 17 and the insert rear piece 18. A depressed or concave portion which has the same depth along its length is formed in an upwardly curved portion of an upper central surface of the insert front piece 15 in the former mold insert (15, 16). Such a depressed or concave portion of the insert front piece 15 is closed with the corresponding curved cavity surface 29 of the insert front piece 17 oppositely disposed from the insert front piece 15. As a result, the cavity space 25 is defined between the cavity surface 29 of the insert front piece 17 and the other cavity surface 28 defined by the upper depressed or concave surface of the insert front piece 15.

A plurality of grooves 19, which are provided in the flat lower surface of the insert front piece 15, extend in parallel to each other toward a curved lower surface of the other insert front piece 17. The lower surface is shown in the drawings as the cavity surface 29 oppositely disposed from the corresponding flat cavity surface 28 of the insert front piece 15 of the movable mold piece 11. These grooves 19 extend vertically in parallel to each other and are spaced from each other at equal intervals.

As for a depth of each of these grooves 19, it is possible to draw a curved phantom line (not shown) through which the grooves 19 have their deepest portions connected with each other. Such a curved phantom line may extend in parallel to the cavity surface 28. In other words, a distance between each of these grooves 19 and this cavity surface 28 is determined to be the same with respect to any one of the grooves 19 in construction.

As for a distance between each of the electric heaters 21 each is received in each of the grooves 19 and the cavity surface 28, preferably a distance set at a value of 4 mm or less. As is clear from the above description, any one of the electric heaters 21 is brought into close contact with the insert front piece 15, which ensures better heat conduction from the electric heaters 21 to the insert front piece 15.

A plurality of grooves 20 of the fixed mold piece 12, are provided in the flat upper surface of the insert rear piece 17, and extend in parallel to each other toward a curved lower surface of the same insert front piece 17. A part of the curved lower surface is shown in the drawings as the cavity surface 29 oppositely disposed from the corresponding curved cavity surface 28 of the insert front piece 15 of the movable mold piece 11. Furthermore, these grooves 20 extend vertically in parallel to each other and are spaced from each other at equal intervals.

As for a depth of each of these grooves 20, it is possible to draw a curved phantom line (not shown) though which the grooves 20 have their deepest portions connected with each other. Such a curved phantom line may extend in parallel to the cavity surface 29. In other words, a distance between the bottom of each these grooves 20 and this cavity surface 29 is determined to be the same with respect to any one of the grooves 20.

A plurality of ribs 23 are provided in a flat upper surface of the insert rear piece 16 at the same equal intervals as those of the grooves 19. These ribs 23 extend in parallel to each other. Each of these ribs 23 has a width slightly smaller than that of the corresponding groove 19 so as to snugly fit into the groove 19; extends upward as viewed in FIG. 8, and has a length slightly shorter in value than a depth of the corresponding groove 19 by an outer diameter of the electric heater 21. Due to this, when the insert front piece 15 of the movable mold piece 11 is coupled to its corresponding insert rear piece 16, the electric heater 21 is pushed into the groove 19 by means of a leading portion of the rib 23 and steadily disposed on the deepest portion of the groove 19.

It is possible to draw a curved phantom line (not shown) though which the ribs have their leading portions connected with each other. Such a curved phantom line may extend in parallel to the cavity surface 28, that is, an upper surface of the insert front piece 15 of the movable mold piece 11. In other words, a shortest distance between the cavity surface 28 and each of the leading portions of the ribs 23 is set at the same value with respect to each of these ribs 23.

Since any one of these ribs 23 has a length slightly shorter than a depth of the corresponding grooves 19 by an outer diameter of the electric heater 21, it is possible for the electric heater 21 to be urged into the groove 19 by means of a leading portion of the rib 23 when the insert front piece 15 of the movable mold piece 11 is coupled to its corresponding insert rear piece 16, whereby each of the electric heaters 21 is steadily disposed on the deepest portion of each of the grooves 19.

A distance of 4 mm or less between each of the electric heaters 21 disposed in each of the grooves 19 and the corresponding cavity surface 28 is preferred.

As is clear from the above, the electric heater 21 is brought into close contact with the insert front piece 15. This ensures better heat conduction from the electric heater 21 to the insert front piece 15.

A plurality of ribs 24 are provided in a flat lower surface of the insert rear piece 18 and are at the same equal intervals as those of the corresponding grooves 20. These ribs 24 extend in parallel to each other and have a width slightly smaller than that of the groove 20 so as to snugly fit into the groove 20, extend downwardly (as viewed in FIG. 8) and have a length slightly shorter in value than a depth of the groove 20 by an outer diameter of the electric heater 22. As a result, when the insert front piece 17 of the fixed mold piece 12 is coupled to its corresponding insert rear piece 18, the electric heater 22 is urged into the groove 20 by means of a leading portion of the rib 24 and steadily disposed on the deepest portion of the groove 20.

It is possible to draw a curved phantom line (not shown) though which the ribs 24 have their leading portions connected with each other. Such a curved phantom line may extend in parallel to the cavity surface 29, that is, a lower surface of the insert front piece 17 of the fixed mold piece 12. In other words, a shortest distance between the cavity surface 29 and each of the leading portions of the ribs 24 is set at the same value with respect to each of these ribs 24.

Since of the ribs 24 have a length slightly shorter than the depth of the corresponding grooves 20 by an outer diameter of the electric heater 22, the electric heater 22 can be urged into the groove 20 by means of a leading portion of the rib 24 when the insert front piece 17 of the fixed mold piece 12 is coupled to its corresponding insert rear piece 18. It follows that each of the electric heaters 22 is steadily disposed on the deepest portion of each of the grooves 20.

A distance of 4 mm or less between each of the electric heaters 22 disposed in each of the grooves 20 and the corresponding cavity surface 29, is preferred.

As is clear from the above, the electric heater 22 is brought into close contact with the insert front piece 17 to ensure better heat conduction from the electric heater 22 to the insert front piece 17.

In any one of the embodiments described above, the power supply employs for example, a "Slidax" (trade name), a thyristor, a stabilized power source and the like, to control its output and both a mold clamping signal and a timer are used to interlock a molding cycle of the mold assembly during operation.

The present invention, also employs a temperature controller for the mold assembly and the movable mold piece 11 carrying the insert rear piece 16 has a cooling medium fluid passage 26 and the fixed mold piece 12 carrying the insert rear piece 18 is provided with the cooling medium fluid passage 17. Therefore, it is possible for the mold assembly to carryout cooling of the insert front and the insert rear pieces at any arbitrary time by opening and closing an electromagnetic valve of the mold assembly. Thus the supply of cooling water passing is controlled through the circuit of the mold assembly, which circuit is connected with the cooling medium fluid passages 26, 27.

In controlling a period of heating time, the timer is used together with the temperature sensor having been built in the mold assembly, all of which permits the temperature of the mold assembly in the cavity surface to be measured and controlled.

In the mold assembly of the present invention even when each of the insert front pieces 15, 17 has a thickness of 4 mm or more, it is possible to dispose each of the electric heaters 21, 22 at any arbitrary depth in each of the corresponding grooves 19, 20, respectively. Hence, it is possible for the mold assembly of the present invention to have sufficient physical strength, which permits it to be subjected to a machining process without causing any distortion.

By setting a distance at a value of 4 mm or less (which distance is between each of the cavity surfaces 28, 29 and each of the bottom surfaces of the grooves 19, 20 on which each of the corresponding electric heaters 19, 20 respectively abuts), it is possible to reduce the heat transfer period of time of the mold assembly, thus permitting the cavity surface to be heated to a predetermined temperature in a short period of time. What follows is that the amount of energy required in increasing a temperature of the cavity surface to the predetermined temperature is reduced and cooling of the cavity space 25 is capable of being rapidly achieved.

Each of the grooves 19, 20 of the insert front pieces 15, 17 has a depth of 4 mm or smaller which may avoid occurrence of distortion in the mold pieces even when the mold pieces are subjected to a pressure applied to the resin inside the mold assembly.

Each of the insert front pieces 15, 17 does not require any space other than those for the grooves 19, 20 adapted for installation of the electric heaters 21, 22. Since the mold assembly is sufficiently strong, reinforcement is not required.

After completion of installation of the electric heaters 21, 22 in the grooves 21, 22 of the insert front pieces 15, 17 respectively, the electric heaters 21, 22 are urged by means of the ribs 23, 24 of the insert rear pieces 16, 18, respectively, to bring electric heaters 21, 22 into close contact with the insert front pieces 15, 17. Better heat conduction between the electric heaters 21, 22 and the corresponding insert front pieces 15, 17 is realized to reduce a loss of heat transfer in the mold assembly. This allows the cavity surface to be efficiently heated to a predetermined temperature.

Using a plurality of the electric heaters 21, 22 in different control circuits from each other, permits different temperature control modes from each other. This results in molded product control in quality and appearance.

When the electric heaters 21, 22 each having a diameter of 4 mm or less are used, in the mold assembly, it is possible to reduce a distance between adjacent electric heaters 21, 22. In other words, it is possible to closely pack these heaters 21, 22 in an arrangement, which enables the cavity surfaces to be evenly heated to a predetermined temperature. Furthermore, since the electric heaters 21, 22 can be readily and manually bent in installation, it is possible to install these heaters 21, 22 even in a curved portion and a shoulder portion of the front insert pieces of the mold assembly.

In this type of heater installation, it is possible to rapidly increase and decrease the temperature of the mold pieces in the mold assembly so as to control resin fluidity in the molding process. It is also possible to prolong a period of solidification time of the resin under retention pressure during the molding process of the resin. This means that the molded product is improved in appearance quality. In addition, since resin fluidity is improved in it is possible for the mold assembly of the present invention to mold a thicker product having a thickness of larger value. The prior art fails to mold or produce such a thicker product.

In addition to the resin injection molding process described above, the present invention is effective and therefore may enjoy the same effect in any other molding processes where molten material flows into a mold piece and is adapted to solidify such molten material into a solidified product of a predetermined shape.

EXAMPLE

Figure 10:
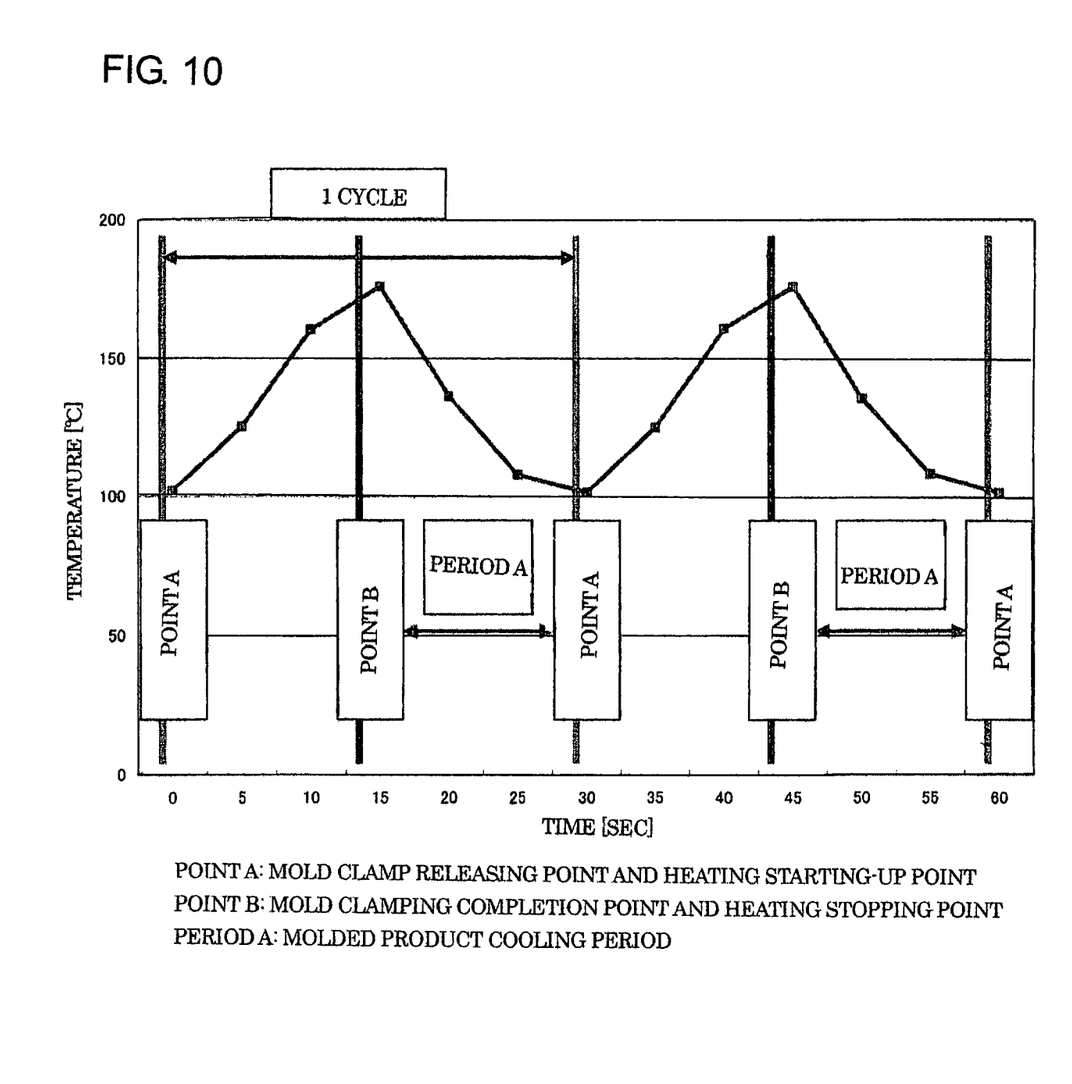
FIG. 10 is a graph showing a temperature variation of the cavity surface in an example of the experiments conducted according the present invention.

A molded product 1 shown in FIG. 9 was produced according to the present invention. As shown in FIG. 10 temperature variation of the cavity surface heated was achieved with the use of an electric heater with an output of 1300 watts. The material of the molded product 1 was polycarbonate (transparent), and had a size of: a length of 100 mm×a width of 50 mm×a thickness of 1.2 mm. A gate of the mold assembly in this example was a piece of side gate.

Water having a temperature of 90° C. was supplied from a mold temperature controller to the entire mold assembly to control the assembly temperature. An electric heater was used which had an outer diameter of 1.6 mm, a power output of 975 watts per meter, and was an "H35 micro heater" manufactured by "Kabushiki Kaisha Okaazaki Seisakusho". With the use of this micro heater, it was possible to increase a temperature of the cavity surface up to 175° C. by heating the cavity surface for a period of 15 seconds.

One cycle of the molding process was conducted as follows:

Step (1)

Upon opening the mold assembly, the electric heater was simultaneously energized to initiate heating of the mold assembly;

Step (2)

In tandem with heating by means of the electric heater, the molded product was retrieved from the mold assembly and the mold assembly was closed;

Step (3)

After completion of clamping of the closed mold assembly, a molten resin was injected into the mold cavity in the assembly. Next, a retention pressure was applied to the mold assembly and heated by means of the electric heater. The heating was conducted for an arbitrary period of time after completion of the mold clamping step but before completion of the retention pressure applying step;

Step (4)

After completion of the retention pressure applying step, the electromagnetic valve for cooling water was opened after starting of the cooling step; so that the cooling water was permitted to pass through the cooling water fluid passage in the mold assembly, and the mold assembly was cooled before the beginning of the heating step of the mold assembly; and Step (5)

The first cycle of the molding process was completed, and the process returns to the step (1) in a subsequent cycle.

In this example, the cavity surface had a temperature of 175° C. Since the temperature of 175° C. is higher than the glass transition temperature of the molded resin which was polycarbonate (its glass transition temperature is 175° C.), the molten resin was solidified as a whole when the molten resin was brought into contact with the cavity surface. Consequently, it is possible for the mold assembly of the present invention to prevent the weld line from occurring in the molded product.

A microscopic inspection of the weld line that appeared in the molded product produced according to the prior art, (a laser microscope used in this inspection) revealed that the weld line had a depth of approximately 5 μm and a width of approximately 15 μm. In comparison with this, in the mold product produced by the use of the mold assembly of the present invention, no weld line was not found at all through similar microscopic inspection.

While the preferred embodiments of the present invention have been described above, such description is for illustrative purposes only, and therefore it is to be understood that various modifications and changes may be made without departing from the spirit or scope of the present invention.

Finally, the present application claims the Convention Priority based on Japanese Patent Application No. 2005-309547 filed on Oct. 25, 2005, which is herein incorporated by reference.

What is claimed is:

1. In a synthetic resin injection molding assembly for producing a molded product the surface of which is replicated from a cavity of said molding assembly when a resinous molding material fills a cavity space defined by a mold insert of the assembly, wherein said mold assembly comprises said mold insert and a mold base for supporting said mold insert, the improvement wherein: said mold insert is divided into an insert front piece having a cavity surface; and, an insert rear piece without a cavity surface, wherein a groove for receiving an electric heater is formed to pass through said insert front piece in the vicinity of said cavity, and said groove extending from a rear surface of said insert front piece and there-through toward said cavity surface, a rib is provided on a front surface of said insert rear piece, and when said insert front piece is coupled to said insert rear piece containing said heater in said groove, said electric heater is pushed by means of a leading portion of said rib and is steadily disposed on a deepest portion of said groove.

2. The synthetic resin molding mold assembly as set forth in claim 1, wherein said electric heater is of a thin pipe type having a diameter of 4 mm or less and having excellent flexibility characteristics.

* * * * *